Dec. 6, 1955 L. MUCCHI 2,725,760
SAFETY ELEMENT LIMITER OF COMPRESSION LOAD
Filed Nov. 6, 1951

Inventor
L. Mucchi

United States Patent Office 2,725,760
Patented Dec. 6, 1955

2,725,760

SAFETY ELEMENT LIMITER OF COMPRESSION LOAD

Leonardo Mucchi, Milan, Italy

Application November 6, 1951, Serial No. 255,104

Claims priority, application Italy November 8, 1950

2 Claims. (Cl. 74—585)

It is well known that all the safety elements, the purpose of which is to limit the possible operating charge, either by breakage or by deflection of the safety element, have in common the defect that the charge to which they can be loaded in normal work must be much inferior to the limit charge.

The safety element, to which this invention refers, has the great advantage that it can be used in normal work up to about the limit charge.

The advantages of this safety element, and its way of functioning, will be clearly seen from the following description. The attached drawing shows schematically by way of example an embodiment of the invention.

Figure 1:
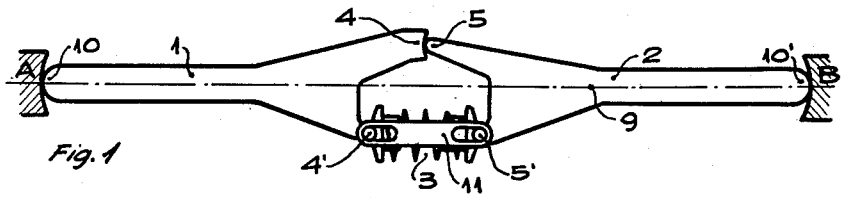

In Figure 1 is shown schematically an embodiment of the invention.

Figure 2:
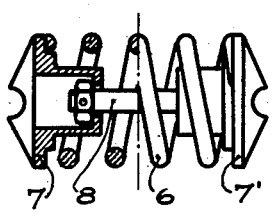

In Figure 2 is shown an embodiment of the element 3 of Fig. 1.

In Figures 3, 4, 5 and 6, there are the geometrical diagrams of the safety element shown in Fig. 1, demonstrating four phases of its functioning.

The safety element is composed of two substantially Y-shaped parts 1 and 2, the ends 10 and 10' of the stems of which rest on the bearings A and B, which are parts of the machine which must be protected against overstressing.

The arms 4 and 5 of the parts 1 and 2 are in direct contact at one side of the straight line 9 joining the contact points of the ends 10 and 10'; between the arms 4' and 5', which are on the opposite side of the above mentioned line 9, is an elastic element 3.

Figure 3:
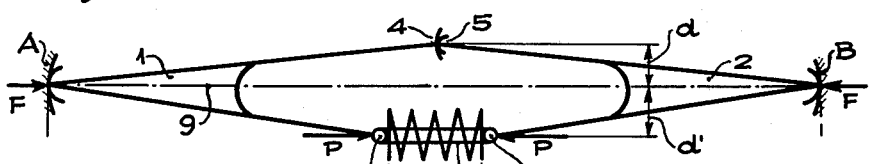

From Fig. 3, which is a geometircal diagram of Fig. 1, it appears that, F being the limit compression load applied by A and B, the elastic element 3 will be subjected to a force P which is a fraction of the load F, according with the equation:

$$P = F \frac{d}{d+d'} \qquad (1)$$

where $d$ and $d'$ are respectively the distance from the line 9 of the point of contact of the arms 4 and 5 and of the centre of the elastic element 3.

The elastic element 3 can be constructed as shown, by way of example, in Fig. 2.

By means of the bolt 8, the spring 6 is compressed between the heads 7 and 7', exactly at the compression P above mentioned.

In these conditions, it is evident that as long as the external compression load does not reach the limit F, the elastic element 3, and consequently the whole safety element, will act as a rigid unit.

Figure 4:
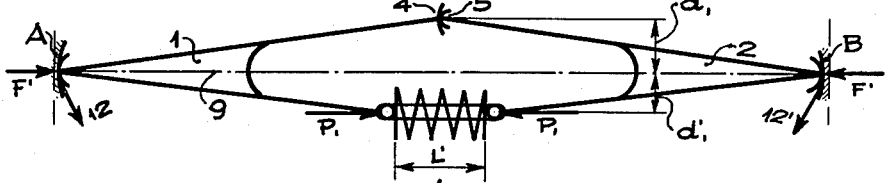

If the compression load surpasses, even slightly, the limit F, the elastic element 3, subjected to a stress greater than P, will shorten. This shortening will compel the two parts 1 and 2 to rotate around the point of contact 4—5, (Fig. 4). Owing to this rotation the distance $d$ (Fig. 3) increases, and the distance $d'$ decreases.

The Fig. 4 shows the beginning of this deflection. Calling $\Delta F$, $\Delta d$, $\Delta d'$, $\Delta P$, $\Delta L$, the variations of F, $d$, $d'$, P, L, it is obtained:

$$F' = F + \Delta F,\ d_1 = d + \Delta d,\ d_1' = d' - \Delta d',$$
$$P_1 = P + \Delta P,\ L_1 = L - \Delta L$$

where $d_1$ and $d_1'$ are the modified values of the distances $d$ and $d'$ when the inflection shown by Fig. 4 takes place.

It is evident that:

$$\frac{d_1}{d_1+d_1'} = \frac{d+\Delta d}{d+d'+\Delta d-\Delta d'} > \frac{d}{d+d'}$$

whence $$P_1 = P + \Delta P = F_1 \frac{d_1}{d_1+d_1'} > F_1 \frac{d}{d+d'}$$

Namely: to the shortening of the elastic element 3 corresponds an increase of the fraction (see Equation 1) of the external compression load which charges the said elastic element.

According to the present invention the unitary deflection variation $p$ of the spring 6 must be in accordance with the two laws:

(a) $$p\Delta L < \Delta P$$

where $$\Delta L = L - L'';\ \Delta P = F - P$$

and (b) $$p(L-L'') < F - P\ (\text{or}\ P + p(L-L'')\Delta F) \qquad (2)$$

where $L''$ (Fig. 5) is the length of the elastic element 3 when, with the continuous rotation, the axis of the elastic element coincides with the straight line joining the points of contact in A and B, and F and P are as in Equation 1.

Figure 5:
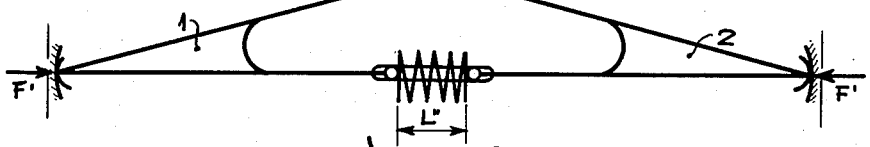
Figure 6:
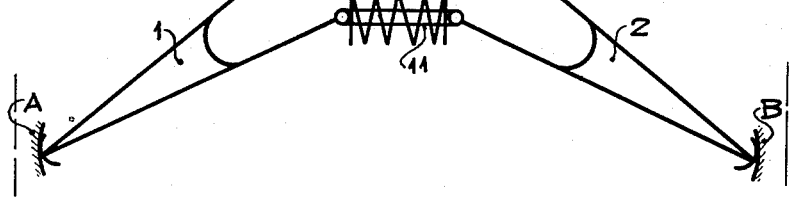

These conditions having been fulfilled, it is evident that when the external compression load surpasses, even slightly, the limit F ($F_1 = F + \Delta F$), and therefore the elastic element 3 begins to shorten and, consequently, the rotation begins, following the arrows 12 and 12', of the two parts 1 and 2, without any further increase of the external compression load, the above mentioned rotation will continue till the safety element, passing through the positions of Figs. 4 and 5 (transit of the dead point), reaches its complete deflection (Fig. 6) in which the distance between the bearings A and B is so shortened that the external compression load is nullified.

A suitable connection 11 of the points 4' and 5' is provided so that there is no danger of a break-up of the assembly during the deflection.

It is evident that, once the cause of the overstress is removed, from the machine, it is sufficient to pull apart the two bearings A and B to obtain the result that the safety element goes back automatically to its former position, ready to resume its function.

The condition expressed by the second formula is:

$$p(L-L'') < F - P \qquad (2)$$

Since F is equal to $$P\frac{d+d'}{d} \qquad (1)$$

F—P is equal to $$P\frac{d'}{d}$$

so that said formula can be written:

$$p(L-L'') < P\frac{d'}{d}$$

This condition is required for the device to collapse without exerting cushioning action, as previously stated.

Having now particularly described and ascertained the nature of my said invention and in what manner the same is to be performed, I declare that what I claim is:

1. A safety device for transmitting compression load not exceeding a predetermined limit comprising two rigid members provided with hinge bearing means and resting against each other through said hinge bearing means, an elastic element between said members and resting against them, means for keeping said elastic member in a condition of precompression independently from said load, a hinge seat on each of said members for receiving and transmitting said load, the axes of said hinge bearing means being parallel to one another, said hinge bearing means and said elastic member being on opposite sides of the plane containing the axes of said hinge seats.

2. A device as claimed in claim 1, in which the maximum increase of the reaction of the elastic element when said two members rotate on said hinge bearing means is less than said precompression multiplied by the ratio between the distances of said elastic element and said hinge bearing means from said plane.

References Cited in the file of this patent

UNITED STATES PATENTS

| | | |
|---|---|---|
| 1,349,033 | Zeh | Aug. 10, 1920 |
| 2,088,821 | Twomley | Aug. 3, 1937 |
| 2,356,204 | Birdsall | Aug. 22, 1944 |